US005210159A

United States Patent [19]

Aoyama et al.

[11] Patent Number: 5,210,159

[45] Date of Patent: May 11, 1993

[54] PROCESS FOR PREPARING POROUS AND WATER-ABSORBENT RESIN

[75] Inventors: Hiroshi Aoyama, Hirakata; Tetsuo Moriya, Takatsuki; Susumu Kondo, Kyoto, all of Japan

[73] Assignee: Nippon Gohsei Kagaku Kogyo Kabushiki Kaisha, Osaka, Japan

[21] Appl. No.: 675,832

[22] Filed: Mar. 27, 1991

[30] Foreign Application Priority Data

Apr. 3, 1990 [JP] Japan .................................... 2-89660

[51] Int. Cl.[5] .......................... C08F 2/18; C08L 33/02

[52] U.S. Cl. ........................................ 526/81; 526/71; 526/80; 526/207; 526/240; 526/317.1

[58] Field of Search ............................ 526/71, 81, 240

[56] References Cited

U.S. PATENT DOCUMENTS 4,037,040 7/1977 Trapasso .............................. 526/88
4,135,043 1/1979 Kast ..................................... 526/63
4,497,930 2/1985 Yamasaki ............................ 524/556
4,727,097 2/1988 Kobayashi .......................... 523/408
4,806,578 2/1989 Kobayashi .......................... 523/402
4,880,886 11/1989 Kondo ................................. 526/80

FOREIGN PATENT DOCUMENTS 60-243106 12/1985 Japan .
61-97301 5/1986 Japan .

*Primary Examiner*—Joseph L. Schofer
*Assistant Examiner*—Fred Zitomer
*Attorney, Agent, or Firm*—Armstrong, Westerman, Hattori, McLeland & Naughton

[57] ABSTRACT

A process for preparing a porous and water-absorbent resin which includes dispersing an aqueous solution containing at least one $\alpha,\beta$-unsaturated carboxylic acid monomer, its alkali metal salt or its ammonium salt in a hydrophobic organic solvent, and conducting a reversed phase suspension polymerization by using a water-soluble radical polymerization initiator, while distilling away the hydrophobic organic solvent together with water. A porous and water-absorbent resin having excellent absorbency and a remarkably improved rate of water absorption can be easily and efficiently obtained on an industrial scale.

7 Claims, No Drawings

PROCESS FOR PREPARING POROUS AND WATER-ABSORBENT RESIN

BACKGROUND OF THE INVENTION

The present invention relates to a process for preparing a water-absorbent resin, and more particularly to a process for preparing a porous and water-absorbent resin which is suitable for use as a water-absorbent material, a water-retaining material, and the like.

In recent years, so-called water-absorbent resins, which are high in absorbancy to an aqueous liquid, are insoluble in water and are capable of swelling with a large amount of water, have been developed, and they have been widely used for various applications.

An aqueous solution polymerization or a reversed phase suspension polymerization has hitherto been applied to the preparation of such a water-absorbent resin.

Generally, although the aqueous solution polymerization system is forcedly heated at the time when polymerization begins, the aqueous solution is heated by the heat of polymerization during polymerization which makes it difficult to control the polymerization temperature.

Also, in reversed phase suspension polymerization, in general, the dispersion medium is boiled, whereby the heat of reaction is removed from the polymerization system. So, it is easy to control the polymerization temperature, therefore, the reversed phase suspension polymerization is remarkably practical in industrial scale.

It is required to obtain a water-absorbent resin having both a high rate of water-absorption and a high water absorbency. However, the products obtained by reversed phase suspension polymerization do not necessarily possess the desirable properties mentioned above. It has been attempted to make the water-absorbent resin particles porous to improve the physical properties of the water-absorbent resin. For example, in a water-in-oil suspension polymerization wherein an aqueous solution of an ethylenically unsaturated monomer is suspended or dispersed in a hydrophobic medium which is inert to polymerization, polymerization is conducted using a specific dispersing agent is used (Japanese Unexamined Patent Publication No. 60-243106), or a mixture of two kinds of dispersing agents is used (Japanese Unexamined Patent Publication No. 61-97301), whereby a porous and water-absorbent resin is obtained.

According to these methods, however, it cannot be so much expected to improve the rate of water-absorption and water absorbency of the water-absorbent resin, because only the surface of the resin particles are made porous.

It is an object of the present invention to provide a process for preparing a water-absorbent resin having an adequate water absorbency and an improved water absorption rate easily and efficiently as an industrial scale.

This and other objects of the present invention will become apparent from the description hereinafter.

SUMMARY OF THE INVENTION

In accordance with the present invention, there is provided a process for preparing a porous and water-absorbent resin which comprises:

dispersing an aqueous solution containing at least one of an $\alpha,\beta$-unsaturated carboxylic acid monomer, its alkali metal salt and its ammonium salt in a hydrophobic and organic solvent in the presence of a dispersing agent, and conducting a reversed phase suspension polymerization by using a water-soluble radical polymerization initiator, while distilling away the hydrophobic and organic solvent together with water to dehydrate.

According to the preparation process of the present invention, the obtained water-absorbent resin is porous, so the above-mentioned objects can be attained.

DETAILED DESCRIPTION

The preparation process of the present invention for a water-absorbent resin employs an aqueous solution containing at least one of an $\alpha,\beta$-unsaturated carboxylic acid monomer, its alkali metal salt and its ammonium salt is dispersed in a hydrophobic organic solvent. A dispersing agent, and if desired a crosslinking agent, are also present. A water-in-oil reversed phase suspension polymerization is conducted, using a water-soluble radical polymerization initiator. Water is distilled away together with the hydrophobic and organic solvent, preferably as an azeotropic mixture during the polymerization. Thus, water-absorbent resin particles which are porous not only outside but also inside are obtained. Therefore, the rate of water absorption is remarkably improved.

Any organic solvent can be used as the hydrophobic solvent so long as it does not inhibit the polymerization reaction and is not miscible with water. Hydrophobic solvents capable of forming into an azeotropic mixture with water are preferred. The azeotropic mixture has an azeotropic temperature at which the water-soluble radical polymerization initiator can be rapidly activated. It is preferable that the azeotropic temperature is from 60° to 75° C. Examples of such solvents are, for instance, cyclohexane, n-hexane, benzene, toluene, and the like.

Examples of the $\alpha,\beta$-unsaturated carboxylic acid monomers are, for instance, acrylic acid, methacrylic acid, itaconic acid, crotonic acid, maleic acid, fumaric acid, and the like. In the present invention, alkali metal salts or ammonium salts of $\alpha,\beta$-unsaturated carboxylic acid monomers are also used. Among them, acrylic acid, methacrylic acid and their alkali metal salts can be preferably used because of a good polymerizability. Examples of the alkali metals used in the alkali metal salt are, for instance, lithium, sodium, potassium, and the like. These monomer may be used alone or in admixture.

In the present invention, at least one of the $\alpha,\beta$-unsaturated carboxylic acid monomer, its alkali metal salt and its ammonium salt (hereinafter referred to as "monomer") is dissolved in water, and the aqueous solution is used. It is preferable to adjust the concentration of the monomer in the aqueous solution to a concentration between 5% by weight below a saturation concentration (saturation concentration—5% by weight) and a saturation concentration, and more preferably to adjust the concentration to a saturation concentration. When the monomer concentration in the aqueous solution is more than 5% below the saturation concentration, the polymerization rate is slow and the obtained water-absorbent resin particles possess insufficient porosity.

The aqueous solution of the monomer is added to the hydrophobic organic solvent in the presence of a dispersing agent and in the presence or absence of a crosslinking agent and the mixture is stirred to give a dispersion. Then, the reversed phase suspension polymerization is carried out, using a water-soluble radical polymerization initiator.

As the dispersing agent used in the present invention, any dispersing agent usually used in suspension polymerization can be used without particular limitation. Examples of the dispersing agents are, for instance, sorbitan monostearate, sorbitan distearate, sorbitan laurate, sorbitan oleate, sorbitan sugar ester, and the like.

It is preferable that the amount of the dispersing agent is from 1 to 10% by weight, preferably from 2 to 8% by weight, based on the monomer. When the amount of the dispersing agent is less than 1% by weight, the obtained particles may form into lumps. On the other hand, when the amount is more than 10% by weight, it is easy to obtain a fine powder.

The reversed phase suspension polymerization may be carried out in the presence or absence of the crosslinking agent. When the reversed phase suspension polymerization is carried out in the presence of the crosslinking agent, the obtained water-absorbent resin generally has an excellent mechanical strength in swollen state formed by water absorption, which is preferable. On the other hand, when the polymerization is carried out in the absence of the crosslinking agent, the obtained resin is a self-crosslinked resin capable of absorbing a large amount of water. Accordingly, whether a crosslinking agent is used or not in the suspension polymerization is decided according to the intended use of the obtained water-absorbent resin.

As the crosslinking agent, compounds polymerizable with the monomer are used. Examples of the crosslinking agents are, for instance, a bis-amide such as N,N-methylenebis(acrylamide), a diacrylate or triacrylate of a polyol such as ethylene glycol, propylene glycol, polyethylene glycol or glycerin, a diglycidyl ether, a triglycidyl ether, and the like.

The crosslinking agent is used in a proper amount according to the use of the obtained water-absorbent resin, in view of the gel strength of the water-absorbent resin in which water is absorbed.

A water-soluble radical polymerization initiator is used to initiate polymerization. Examples of the water-soluble radical polymerization initiator are, for instance, a persulfate such as ammonium persulfate or potassium persulfate, a peroxide such as hydrogen peroxide, a water-soluble azo-compound such as 2,2-azobis-(2-amidinopropane) hydrochloride, and the like. The amount of the polymerization initiator is generally from 0.01 to 1% by weight based on the monomer, preferably from 0.02 to 0.5% by weight.

The aqueous solution containing the monomer can be added to the hydrophobic organic solvent in any manner, for instance, at once, intermittently or continuously. It is desirable that the aqueous solution containing the monomer be suspended in the hydrophobic organic solvent in a final weight ratio of the hydrophobic organic solvent to the aqueous solution of from 10/1 to 1/1, more preferably from 5/1 to 2/1.

The heat of reaction of a reversed phase suspension polymerization can be removed by the boiling of the dispersion medium, so it is easy to control the polymerization temperature. According to the present invention, the dispersion medium, namely the hydrophobic organic solvent and the aqueous solution are forcedly boiled by heating, whereby the azeotropic dehydration effect is heightened and dehydration is conducted during the polymerization. It is preferable that during the polymerization, the polymerization temperature is kept at the azeotropic temperature of the mixture of the hydrophobic organic solvent and water. Accordingly, the polymerization temperature depends on the azeotropic temperature of the mixture of the hydrophobic organic solvent and water, and cannot be generally decided. Usually, the polymerization temperature is from 60° to 80° C. Also, it is preferable that the polymerization time is from about 0.5 to 3 hours.

In the suspension polymerization of the present invention, it is preferable that the polymerization is conducted while distilling away the azeotropic mixture of the hydrophobic organic solvent and water from the polymerization system by adding intermittently or continuously the aqueous solution containing the monomer and the water-soluble radical polymerization initiator to the hydrophobic organic solvent, because the heat of polymerization is uniformly generated and the polymerization reaction can be kept stable.

It is preferable that the dehydration is conducted so that the obtained water-absorbent resin (the resin immediately after the completion of polymerization) has a water content of 35 to 55% by weight, more preferably from 42 to 52% by weight. When the water content is more than 55% by weight, the subsequently conducted dehydration cannot be adequately conducted and the obtained resin is not made sufficiently porous, thus resulting in lowering of the water absorption rate. On the other hand, when the water content is less than 35% by weight, the resin particles are not sufficiently dispersed during the polymerization, thus resulting in generation of lumps of the resin.

IT is possible that the azeotropic dehydration is carried out continuously after completing the suspension polymerization.

The water-absorbent resin obtained by the process of the present invention is in the state of particles and the whole particle is porous, in other words, not only the surface but also the inside of the particles are porous. Further, the resin is high in water absorption rate because of its large surface area. Also, the surface of the resin particles is very uneven, so granules are easily produced from the particles by using a binder.

The present invention is more specifically described and explained by means of the following example, in which all percents and parts are by weight unless otherwise noted. It is to be understood that the present invention is not limited to the Examples, and various changes and modifications can be made in the invention without departing from the spirit and scope thereof.

EXAMPLE 1

An aqueous solution containing a partially neutralized acrylic acid was prepared by adding dropwise 37.8 kg of a 28% aqueous solution of sodium hydroxide to 31.6 kg of a 80% aqueous solution of acrylic acid with stirring. The concentration of the partially neutralized acrylic acid in the aqueous solution was 44.8% (saturation concentration) at 25° C. To the aqueous solution cooled at 25° C. was added 7.58 g of ammonium persulfate dissolved in 0.5 kg of water. Then, nitrogen gas was introduced to remove oxygen dissolved polymerization (monomer concentration: 44.5%) was obtained.

On the other hand, a 200l polymerization vessel equipped with a reflux condensor having a water separator and a stirrer was charged with 110l of cyclohexane and 430 g of sorbitan monosteanately, to which nitrogen gas was introduced to remove the dissolved oxygen, and the temperature was raised to 73° C.

To the polymerization vessel was added dropwise the solution for polymerization as obtained above over 3 hours. During the addition, the temperature of a water jacket of the vessel was kept at 75° C, whereby the azeotropic mixture of cyclohexane and water was distilled away from the polymerization system, as a result, 2.5 kg of water was removed from the polymerization system.

The obtained water-absorbent resin had a water content of 53.9% immediately after the completion of the polymerization.

Subsequently, the azeotropic dehydration was continued until a water content of the resin reached to 25%, then the temperature was cooled to 30° C. and the reaction mixture was filtrated by using a suction filtrator to give water-absorbent resin particles.

Physical properties of the obtained water-absorbent resin were measured as shown below. The surface of the water-absorbent resin particles was observed by an electron microscope.

The results are shown in Table 1 together with a water content of the water-absorbent resin immediately after the completion of the polymerization.

Rate of water absorption

A rate of water absorption is measured, using 50 g of an 0.9% aqueous sodium chloride solution as follows:

A 100 ml beaker is charged with 50 g of 0/9% aqueous sodium chloride solution and a stirring bar, then while stirring on a magnetic stirrer, 1.0 g of a water-absorbent resin was added, whereby the resin was swollen and the stirring was naturally stopped by the to the stop of the stirring is measured and shown as an index for the rate of water absorption.

Amount of absorbed physiological saline water

About 0.100 g of the water-absorbent resin is exactly weighed, and it is introduced into a 300 ml beaker charged with 60 g of physiological saline water. After one hour, the mixture was filtered through a 200-mesh wire net. An amount of the filtrate (B g) is weighed and an amount of the absorbed saline is culculated according to the following equation.

$$\text{(Amount of the absorbed physiological saline water)} = \frac{60 - B}{0.100} \text{ (g/g)}$$

EXAMPLES 2 to 4

The procedure of Example 1 was repeated except that the temperature of the water jacket and the amount of separated water were charged to those shown in Table 1 to give a water-absorbent resin.

As to the obtained resin, the physical properties and the surface of the particles were measured in the same manner as in Example 1.

The results are shown in Table 1 together with a water content of the resin immediately after the completion of the polymerization.

EXAMPLE 5

The procedure of Example 3 was repeated except that 1.26 g of N,N'-methylenebis-(acrylamide) was used together with sorbitan monosteanate to give a water-absorbent resin.

As to the obtained resin, the physical properties and the surface of the particles were measured in the same manner as in Example 1.

The results are shown in Table 1 together with a water content of the resin immediately after the completion of the polymerization.

COMPARATIVE EXAMPLE 1

The procedure of Example 1 was repeated except that water was not removed from the polymerization system by keeping the temperature of the water jacket at 70° C., which was below the azeotropic temperature of the mixture of cyclohexane and water, to give a water-absorbent resin.

As to the obtained resin, the physical properties and the surface of the particles were measured in the same manner as in Example 1.

The results are shown in Table 1 together with a water content immediately after the completion of the polymerization.

TABLE 1

| | Temperature of warm water in a jacket (°C.) | Amount of removed water during polymerization (kg) | Water content of the resin immediately after the completion of polymerization (%) | Surface state of particles (degree of porosity) | Physical properties of water-absorbent resin: Rate of water absorption (second) | Physical properties of water-absorbent resin: Amount of physiological saline water absorbed (g/g) |
|---|---|---|---|---|---|---|
| Ex. No. | | | | | | |
| 1 | 75 | 2.5 | 53.9 | a little rough (porosity: high) | 47 | 83 |
| 2 | 83 | 5.0 | 52.1 | rough (porosity: high) | 37 | 75 |
| 3 | 89 | 10.0 | 48.1 | very rough (porosity: very high) | 30 | 73 |
| 4 | 97 | 20.0 | 37.7 | very rough (porosity: very high) | 30 | 72 |
| 5 | 89 | 10.0 | 48.1 | very rough (porosity: very high) | 31 | 72 |
| Com. Ex. | | | | | | |
| 1 | 70 | 0 | 55.5 | smooth (non-porous) | 72 | 72 |

From the results shown in Table 1, it would be recognized that all of the water-absorbent resins obtained in Examples 1-5 are as excellent in absorbency as the water-absorbent resin obtained in Comparative Example 1, and further the water-absorbent resins obtained in Examples 1-5 are remarkably improved in rate of water absorption compared to the water-absorbent resin obtained in Comparative Example 1.

According to the preparation process of the present invention, the water-absorbent resin whose water absorption rate is remarkably improved as well as whose absorbency is as excellent as the known one and moreover which is porous, in other words, from which granules are easily formed, can be easily and efficiently produced in industrial scale.

Accordingly, the water-absorbent resin obtained by the process of the present invention is suitable for use as a water absorbent used in a sanitary goods such as paper diapers and sanitary napkins, water-retaining agents in soil conditioners, additives for cement, and the like.

In addition to the ingredients used in the Examples, other ingredients can be used in the Examples as set forth in the specification to obtain substantially the same result.

What we claim is:

1. A process for preparing a porous and water-absorbent resin which comprises:

dispersing an aqueous solution containing at least one of an $\alpha,\beta$-unsaturated carboxylic acid monomer, its alkali metal salt and its ammonium salt in a hydrophobic organic solvent in the presence of a dispersing agent, and conducting a reversed phase suspension polymerization by using a water-soluble radical polymerization initiator, while distilling away the hydrophobic organic solvent together with water to dehydrate, wherein the distillation is begun during continuous or intermittent addition of said aqueous solution to said solvent and wherein said distillation is continued during said polymerization.

2. The process of claim 1, wherein said hydrophobic and organic solvent and water are distilled away as an azeotropic mixture.

3. The process of claim 1, wherein said polymerization is conducted in the presence of a crosslinking agent.

4. The process of claim 1, wherein water is removed from the polymerization system so that the resin immediately after the completion of said polymerization has a water content of 35 to 55% by weight.

5. The process of claim 1, wherein said aqueous solution has a concentration of at least one of said carboxylic acid monomer, its alkali metal salt and its ammonium salt between a concentration of 5% by weight below a saturation concentration and a saturation concentration.

6. The process of claim 1, wherein dehydration is begun simultaneously with the start of the addition of said aqueous solution.

7. The process of claim 1, wherein said aqueous solution is added to said solvent maintained at a temperature of not less than an azeotropic temperature of a mixture of water and said solvent.

* * * * *